(12) United States Patent
Ennis

(10) Patent No.: US 8,217,611 B2
(45) Date of Patent: Jul. 10, 2012

(54) AUTOMATED REFRIGERATOR OPENER

(76) Inventor: G. Thomas Ennis, Inglewood, CA (US)

( * ) Notice: Subject to any disclaimer, the term of this patent is extended or adjusted under 35 U.S.C. 154(b) by 223 days.

(21) Appl. No.: 12/797,755

(22) Filed: Jun. 10, 2010

(65) Prior Publication Data

US 2011/0307098 A1  Dec. 15, 2011

(51) Int. Cl.
*G05B 5/00* (2006.01)
*H02H 7/08* (2006.01)
*H02P 1/00* (2006.01)

(52) U.S. Cl. ........ 318/445; 318/135; 318/282; 318/283; 312/326

(58) Field of Classification Search ................... 318/445, 318/135, 282, 283; 312/326
See application file for complete search history.

(56) References Cited

U.S. PATENT DOCUMENTS

| | | | | |
|---|---|---|---|---|
| 5,134,324 A | * | 7/1992 | Sakagami et al. | 310/12.04 |
| 5,146,713 A | * | 9/1992 | Grafius | 49/255 |
| 6,751,909 B2 | * | 6/2004 | Ranaudo | 49/506 |
| 6,891,479 B1 | * | 5/2005 | Eccleston | 340/686.1 |
| 7,556,324 B2 | * | 7/2009 | Benz | 312/405 |

* cited by examiner

*Primary Examiner* — Walter Benson
*Assistant Examiner* — Erick Glass
(74) *Attorney, Agent, or Firm* — Risso & Associates; Marcus Risso

(57) ABSTRACT

An automated refrigerator opener is described. The automated refrigerator opener includes a door seal separator (e.g., solenoid) for breaking a door seal between a refrigerator door and a refrigerator door casing. Also included is a powered door opener (e.g., linear actuator) for attaching with a refrigerator door and automatically opening the refrigerator door after the door seal is broken. A control device is communicatively connected with both the door seal separator and the powered door opener. The control device is operable for receiving an actuation command from a user and, thereafter, activates the door seal separator to break the door seal and cause the powered door opener to open the refrigerator door. Alternatively, if the door is already open, the control device is operable for causing the powered door opener to pull the door closed.

26 Claims, 9 Drawing Sheets

AUTOMATED REFRIGERATOR OPENER

BACKGROUND OF THE INVENTION (1) Field of Invention

The present invention relates to a refrigerator opener and, more particularly, to an automated refrigerator opener that is operable for breaking the seal on a refrigerator and, thereafter, safely opening the refrigerator.

(2) Description of Related Art

A refrigerator is a cooling appliance that is used to transfer heat from its interior to the external environment. In doing so, the interior of the refrigerator cools to a temperature that is below the ambient temperature. By cooling the interior, food can be stored therein to prolong the life of the food and reduce the rate of spoilage. The process of transferring heat from the interior of the refrigerator to cool the appliance requires a certain amount of energy. Due to the energy requirements for "cooling," it is desirable to seal the refrigerator so that the cool air is not lost and that the sub-ambient temperature of the interior can be maintained.

To prevent loss of cool air, typical refrigerators come with a sealing mechanism to seal the refrigerator's door against its casing or frame. In other words, the interior of the refrigerator is commonly accessed through a refrigerator door that is hingedly connected with a door casing. To prevent air from seeping around the edges of the door, the door casing is commonly formed of a metallic material and a magnetic seal is wrapped around the door. Thus, when the door is closed, the magnetic seal creates an air-tight seal with the metallic door casing.

The magnetic attraction between the magnetic seal and the metallic door casing can sometimes make the refrigerator difficult to open. This can be compounded due to the refrigerator operations, which can create a pressure differential between the interior and ambient pressure. In other words, as the refrigerator is cooled, a negative pressure can sometimes be created within the refrigerator, further maintaining the refrigerator door against the door casing.

Thus, to open the door, a user must first break the door seal. In older refrigerators with worn out magnetic seals, this is often easy. However, in some newer refrigerators, the door seal can be very strong and, in some cases, extremely difficult to break.

In order to break the seal, the user must inherently use their hands and pull upon the door. However, in some circumstances, the user's hands are full of food and/or other items, which requires the user to free their hands before attempting to access the refrigerator.

Thus, a continuing need exists for a hands-free automated refrigerator opener that is operable for breaking the door seal and opening the refrigerator door.

SUMMARY OF INVENTION

While considering the failure of others to make use of all of the above components in this technology space, the inventor unexpectedly realized that an automated refrigerator opener that uses a door seal separator to break the door seal in conjunction with a linear actuator to open the door, would provide for a hands-free automated refrigerator opener. Thus, in operation, both of the user's hands are free and usable, rather than requiring the user to occupy one hand to open the door.

Thus, the present invention is directed to an automated refrigerator opener. The automated refrigerator opener includes a door seal separator (e.g., solenoid) for breaking a door seal between a refrigerator door and a refrigerator door casing. Also included is a powered door opener (e.g., linear actuator) for attaching with a refrigerator door and automatically opening and/or closing the refrigerator door after the door seal is broken. A control device is communicatively connected with both the door seal separator and the powered door opener. The control device is operable for receiving an actuation command from a user and, thereafter, activates the door seal separator to break the door seal and cause the powered door opener to open the refrigerator door. Alternatively, if the door is already open, the control device is operable for causing the powered door opener to pull the door closed.

In another aspect, the powered door opener (or linear actuator) includes a base attachment end and an extension end, with the base attachment end being pivotally attachable with a refrigerator. An elastic device (e.g., coil spring) is attached with the extension end of the linear actuator. The elastic device is also attachable with the refrigerator door.

To power the automated refrigerator opener, an adapter is electronically connected with the control device. The adapter includes a male end that is configured to screw into a refrigerator light socket and a female end that is configured to receive and provide electricity to a light bulb. Thus, upon screwing the adapter into a refrigerator light socket, electricity can be provided to the automated refrigerator opener while also providing electricity to the light bulb.

In another aspect and as can be appreciated by one skilled in the art, the light socket within a refrigerator is sometimes powered only when the refrigerator door is open. Thus, the control device can include a rechargeable battery (or be connected with a rechargeable battery) that is charged while the light socket is powered.

In yet another aspect, the automated refrigerator opener includes a power cord that can be plugged into a power outlet to power the opener and its various components.

Additionally, the control device can be formed to include a timer such that upon opening the door, after a predetermined amount of time has passed and no close command has been received, the control device is configured to initiate a close command and cause the powered door opener to close the door.

In automatically opening and/or closing the door, it is desirable to incorporate safety features to prevent unwanted motion of the door. Thus, in another aspect, at least one of the control device and powered door opener include a safety mechanism to disable operation of the powered door opener upon activation of the safety mechanism. The safety mechanism is a mechanism selected from a group consisting of an amp meter and a slip clutch.

In yet another aspect, a microphone is communicatively connected with the control device. In this aspect, the control device is configured to receive voice commands (audio signals) to activate the automated refrigerator opener. Upon receiving audio signals from the microphone, the control device is operable for interpreting the audio signals to determine if an open command or a closed command was received.

Alternatively, a switching device that is communicatively connected with the control device can be used to operate the system. Examples of such switching devices include a hand controller, a foot controller, and a proximity sensor.

Finally, as can be appreciated by one in the art, the present invention also comprises a method for forming and using the invention described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
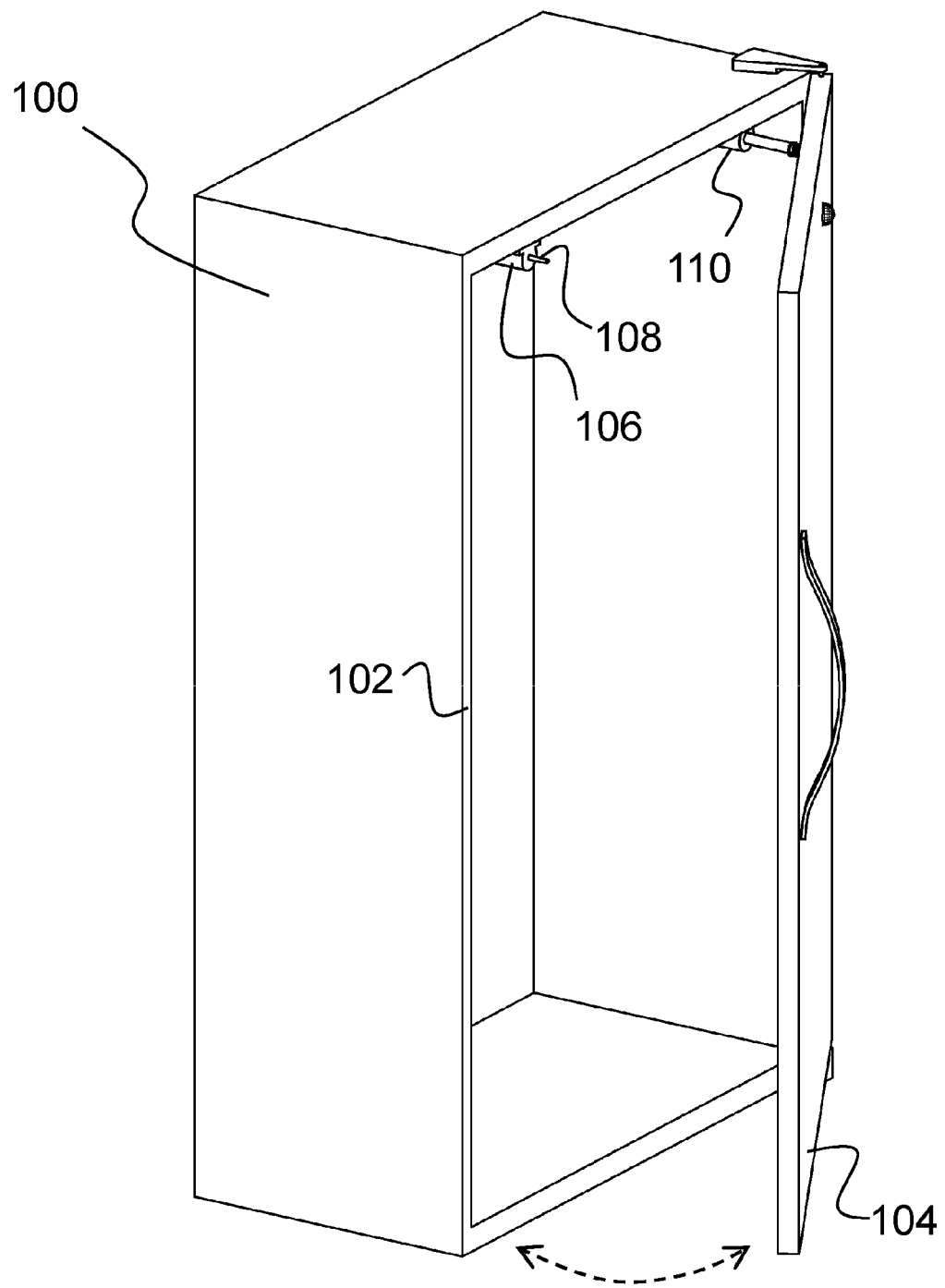
FIG. 1 is a perspective-view illustration of a refrigerator with an automated refrigerator opener incorporated therein.

The present invention relates to a refrigerator opener and, more particularly, to an automated refrigerator opener that is operable for breaking the seal on a refrigerator and, thereafter, safely opening the refrigerator. The following description is presented to enable one of ordinary skill in the art to make and use the invention and to incorporate it in the context of particular applications.

Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

As noted above, to prevent loss of cool air, refrigerators typically come with a magnetic seal to seal the refrigerator's door against its metallic door casing. The magnetic attraction between the magnetic seal and the metallic door casing can sometimes make the refrigerator difficult to open, which can be further compounded by a negative pressure that is often formed within the refrigerator. Additionally, in some circumstances, it may be desirable to access the refrigerator without the use of one's hands.

Thus, the present invention improves upon the prior art by providing a hands-free automated refrigerator opener that is operable for breaking the door seal and opening the refrigerator door. As shown in FIG. 1, a refrigerator 100 typically includes a metallic door casing 102 and a refrigerator door 104. To open the refrigerator door 104, the automated refrigerator opener according to the present invention includes a door seal separator 106 that is operable for breaking a door seal between the refrigerator door 104 and the door casing 102. The door seal separator 106 is any suitable mechanism or device that is operable for breaking the door seal, a non-limiting example of which includes an electronic solenoid with a push rod 108 that can be selectively extended to push the door 104 from the door casing 102.

Once the door seal is broken, a powered door opener 110 is used. The powered door opener 110 can be attached between the refrigerator 100 and the refrigerator door 104 and is operable for opening and/or closing the refrigerator door 104. The powered door opener 110 is any suitable mechanism or device that is operable for selectively opening and/or closing a refrigerator door 104, a non-limiting example of which includes a linear actuator. As can be appreciated by one skilled in the art, any suitable linear actuator can be used, non-limiting examples of which include mechanical actuators, hydraulic actuators, piezoelectric actuators, electro-mechanical actuators, linear motors, and segmented spindles.

Figure 2:
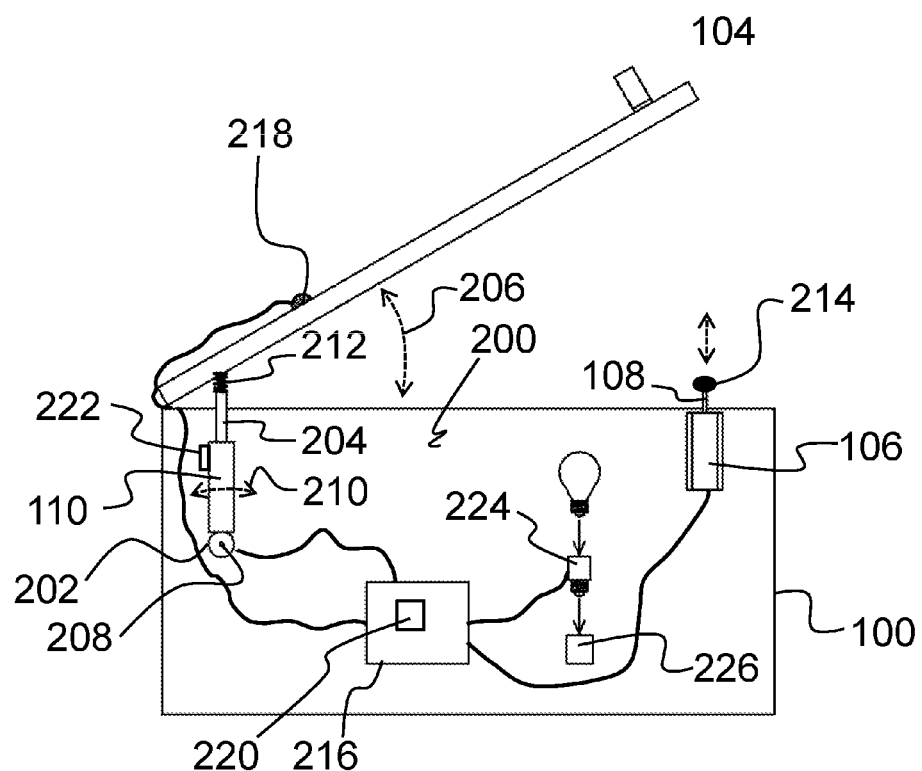
FIG. 2 is an illustration depicting a top, interior-view of the refrigerator in an open position.

FIG. 2 provides an interior view of the refrigerator 100, depicting the automated refrigerator opener as attached with an interior roof 200 of the refrigerator 100. As depicted, the powered door opener 110 includes a base attachment end 202 and an extension end 204 (e.g., piston, screw, sliding tube, etc.) that is connected with the door 104. As the door 104 opens, the angle of attachment 206 between the powered door opener 110 and the door 104 will change. Thus, the base attachment end 202 is pivotally attachable with a refrigerator 100 to accommodate the changing angle of attachment 206. Thus, as the extension end 204 extends and causes the door 104 to open, the angle of attachment 206 increases which causes powered door opener 110 to pivot about the pivotal attachment 208 and move laterally 210. Alternatively, when the extension end 204 retracts and pulls the door 104 closed, the angle of attachment 206 decreases, which, again, causes the powered door opener 110 to move laterally 210.

To soften the effect or otherwise decreases the rigidity of the opening and closing of the door 104, an elastic device 212 is attached with and between the extension end 204 of the powered door opener 110 and the door 104. Thus, the connection between the powered door opener 110 and the door 104 provides for a little give or elasticity. Any suitable elastic device 212 can be used to elasticize the connection between the door 104 and powered door opener 110, non-limiting examples of which include a coil spring and a rubber bushing.

Additionally, a bumper 214 can be attached with the push rod 108 of the door seal separator 106 to soften the contact between the push rod 108 and the door 104. The bumper 214 is any suitable mechanism or device for softening or cushioning the impact between two items, a non-limiting example of which includes a rubber stop or bushing.

A control device 216 is included to operate the powered door opener 110 and the door seal separator 106. The control device 216 is any suitable mechanism or device that is operable for controlling various electronic functions of the automated refrigerator opener, non-limiting examples of which include being a microprocessor or integrated circuit and/or, in a simple aspect, a simple switching device (as described in further detail below). Thus, as can be appreciated by one skilled in the art, the control device 216 can simply be a switching device (such as a button, etc.) alone or can be more advanced to include a microprocessor and additional electronic functions.

The control device 216 is communicatively connected (e.g., electrically wired or wirelessly connected) with at least one of (and desirably both) the door seal separator 106 and the powered door opener 110. The control device 216 is operable for receiving an actuation command from a user and, thereafter, activates the door seal separator 106 to break the door seal and cause the powered door opener 110 to open the refrigerator door 110. Alternatively, if the door 104 is already open, the control device 216 is operable to activate the powered door opener 110 and cause the extension end 204 to retract and close the door 104.

Thus, in receiving an actuation command, the control device 216 determines if an open command or a closed command was received and, if so, performs an appropriate open or close operation by causing the powered door opener 110 to open or close the door 104. As can be understood by one skilled in the art, the term "determines" does not necessarily mean that a processing function is being used and, instead, can mean that simply circuitry determines which command is being received. For example, if an open button and a closed button are used, then the control device 216 simply performs the appropriate command based on the circuit from which the signal is being sent. In a simple aspect, the control device 216 is a switching device (as described in further detail below) and the actuation command is the completion of a circuit (such as by a user depressing an open/close button) to cause the powered door opener 110 to open or close the door 104.

Alternatively, the control device 216 can be configured to include a microprocessor and perform a determination function. For example, a microphone 218 can be communicatively connected (e.g., wired or wirelessly) with the control device 216. Through the microphone 218, the control device 216 can be configured to receive voice commands (e.g., audio signals) to activate the automated refrigerator opener. Upon receiving audio signals from the microphone 218, the control device 216 is encoded or configured to interpret the audio signals to determine if an open command or a closed command was received. Thus, the control device 216 can be formed to include voice-activated functionality. In doing so, the control device 216 operates as a microprocessor with a voice recognition system. As can be appreciated by one skilled in the art, any suitable voice recognition system and/or software can be used to recognize open and close commands.

In some instances it may be desirable to lock particular users out of the refrigerator 100. Thus, the control device 216 can also be configured to accept lock and/or open commands from particular users. For example, the control device 216 can be programmed to accept only open commands from a particular person as recognized by a particular voice. As another example, a keypad or code pad can be connected with the control device 216 such that an appropriate unlock code must be entered before the control device 216 will initiate an open command to the components of the system.

In another aspect, after opening the door 104, it may be that the user fails or forgets to close the door 104. Thus, the control device 216 can include a timer such that upon opening the door 104, after a predetermined amount of time has passed and no close command has been received, the control device 216 is configured to initiate a close command and cause the powered door opener 110 to close the door 104 (e.g., by causing the extension end 204 to retract).

In automatically opening and/or closing the door 104, it is desirable to incorporate safety features to prevent unwanted motion of the door 104. For example, if a child is standing in front of the door 104 and the door 104 opens into the child, it is desirable to cause the door 104 to stop its motion as opposed to pushing further into the child. Thus, the present invention includes a safety mechanism. The control device 216 and/or powered door opener 110 include a safety mechanism to disable operation of the powered door opener 110 upon activation of the safety mechanism. The safety mechanism 216 is any suitable mechanism or device that is operable for ceasing operation of the invention, such as the powered door opener 110. For example, an amp meter 220 can be included in the control device 216 such that if resistance is received while opening and/or closing the door 104, the amp meter 220 registers the resistance which causes the control device 216 to cease or reverse operation of the powered door opener 110. As another example, a slip clutch mechanism 222 can be included within or attached with the powered door opener 110. Thus, if a certain amount of resistance is received by the powered door opener 110, the slip clutch mechanism 222 causes the power door opener 110 to disengage and cease opening and/or closing the door 104.

The automated refrigerator opener can be powered through any suitable power technique, mechanism or device. For example, a standard electrical cord can be included to allow a user to plug the device into an outlet. Alternatively, batteries may be employed. In another aspect and as depicted in FIG. 2, an adapter 224 is electronically connected with the control device 216 (and/or other components of the automated refrigerator opener) for providing power to the automated refrigerator opener. The adapter 224 includes a male end configured to attach with (e.g., screw into) a refrigerator light socket 226 and a female end configured to receive a light bulb. Thus, upon screwing the adapter 224 into a refrigerator light socket 226, electricity can be provided to the automated refrigerator opener.

In another aspect and as can be appreciated by one skilled in the art, the light socket 226 within a refrigerator 100 is sometimes powered only when the refrigerator door 104 is open. Thus, the control device 216 can include a rechargeable battery (or be connected with a rechargeable battery) that is charged (via the adapter 224) while the light socket 226 is powered.

In another aspect, the automated refrigerator opener can be integrally incorporated into the refrigerator 100 and receive power via the power system in the refrigerator 100.

Figure 3:
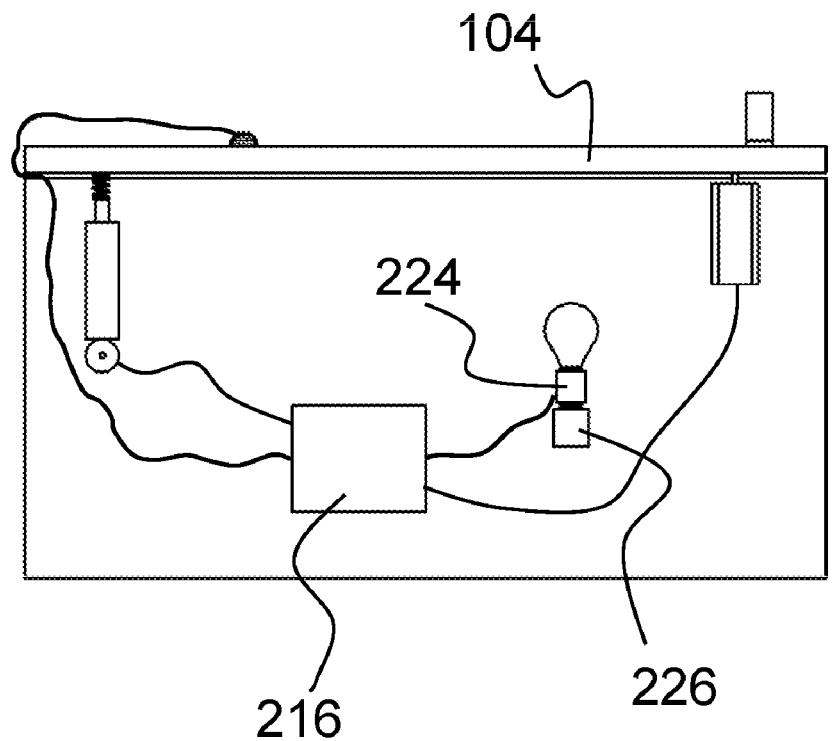
FIG. 3 is an illustration depicting a top, interior-view of the refrigerator in a closed position.

For further illustration, FIG. 3 depicts the refrigerator door 104 in a closed position. As shown, the adapter 224 is attached with the light socket 226 to provide power to the control device 216 and automated refrigerator opener.

Figure 4:
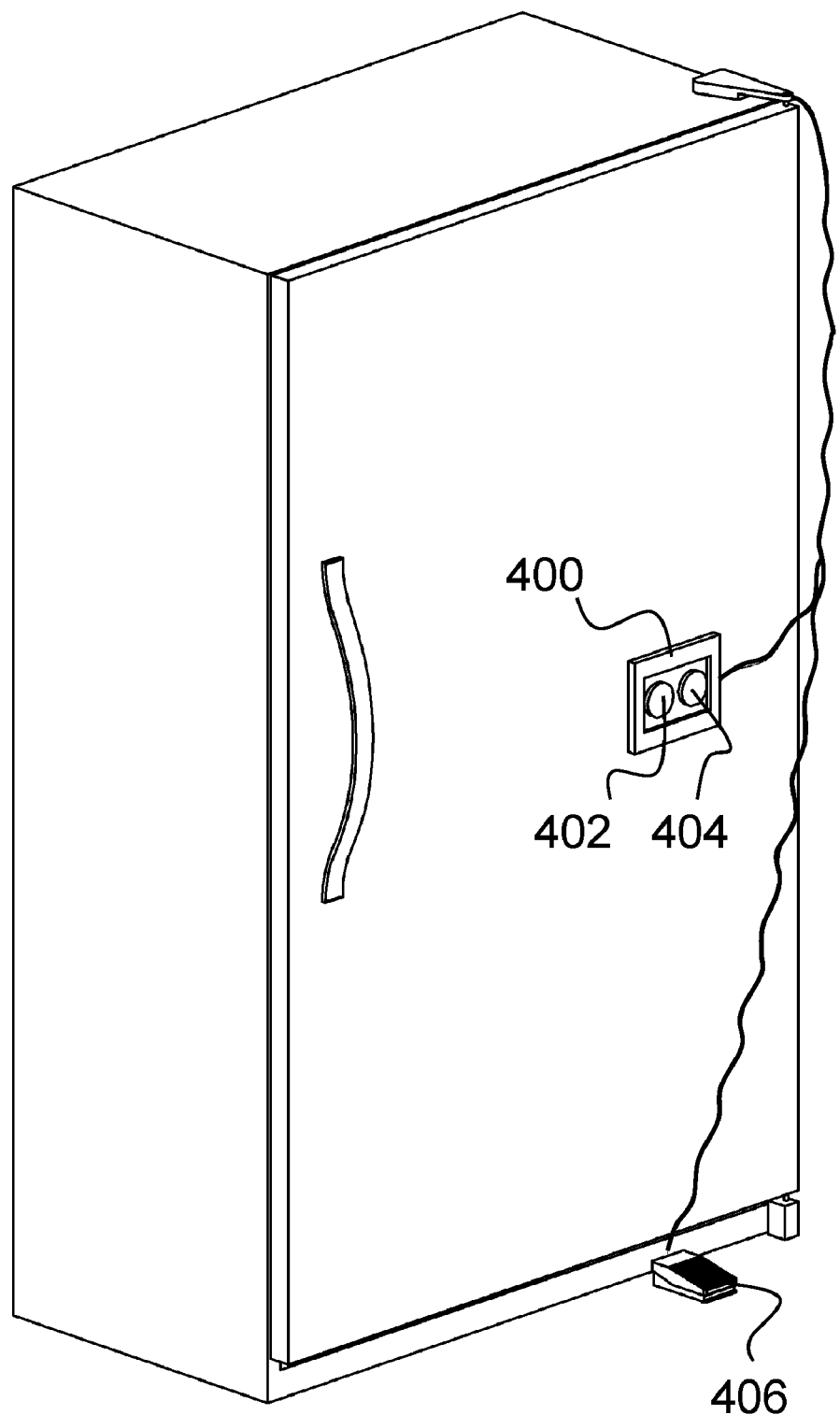
FIG. 4 is a perspective-view illustration of a refrigerator with an automated refrigerator opener according to the present invention.

As described above, the present invention can be operated via voice command. However, the present invention is not intended to be limited thereto as a variety of Off/On mechanisms can be used. For example and as depicted in FIG. 4, a switching device is communicatively connected (e.g., wired or wirelessly) with the control device (or the switching device can operate as the control device itself). The switching device is any suitable mechanism or device that is operable for providing an open and/or closed signal to the control device. Non-limiting examples of suitable switching devices include a hand controller 400 (with an open 402 and close 404 button) a foot controller 406, and a proximity sensor (described in further detail below).

Figure 5:
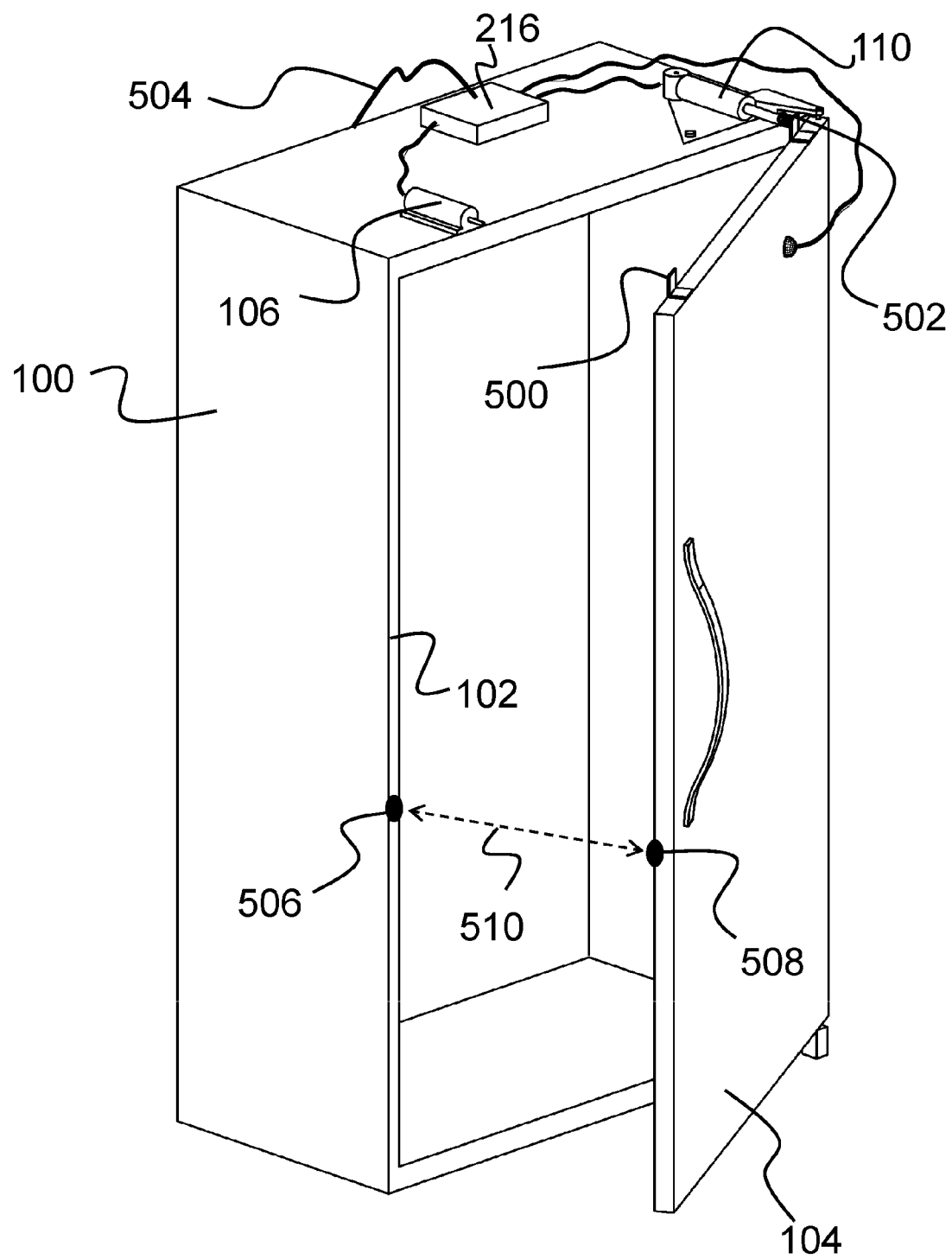
FIG. 5 is a perspective-view illustration of a refrigerator with an automated refrigerator opener according to the present invention.

It should be understood that the automated refrigerator opener according to the present invention can be provided as a kit for attachment with existing refrigerators (i.e., refrigerators that do not currently posses such an automated refrigerator opener). As described above and depicted in FIGS. 1 through 3, the various components of the automated refrigerator can be attached within the refrigerator cavity. As another example and as depicted in FIG. 5, the components of the automated refrigerator opener can be mounted to the periphery or external portion of the refrigerator 100. For example, the control device 216, the power door opener 110, and the door seal separator 106 can all be mounted on top of the refrigerator 100. In this aspect, a separator bracket 500 can be mounted to the refrigerator door 104 such that the door seal separator 106 can engage with the separator bracket 500 to force the door 104 away from the door casing 102 and, thereby break the door seal. Additionally, an opener bracket 502 can be mounted on the door 104 to attach with the powered door opener 110. Thus, once the door seal is broken, the powered door opener 110 can force the door 104 open. Alternatively, if already open, the powered door opener 110 can pull the door 104 closed via the opener bracket 502. When mounted externally, although not limited thereto, it may be desirable to power the automated refrigerator via a standard electrical cord 504 that can plug into an electrical outlet. Further, the brackets described above are optional items and may not be required for all refrigerators (depending on the shape of the door). For example, refrigerators with doors that extend beyond the top of the main refrigerator shell may not need the brackets.

As noted above, a proximity sensor can be used as a switching device for the present invention. The proximity sensor is any suitable mechanism or device that is operable for determining the proximity of a user, a non-limiting example of which includes a beam sensor. For example, the beam sensor includes a beam transmitter 506 and a beam reflector 508. When the door 104 is open and the user is accessing the refrigerator, the user's body will break the beam 510 which will indicate that the refrigerator is in use. If the beam 510 remains unbroken for a predetermined period of time, then the control device 216 will actuate the system to close the refrigerator door 104.

As described herein, the present invention includes a door seal separator for breaking the door seal between the refrigerator door and a door casing, and a powered door opener for opening the refrigerator door once the seal is broken. Depicted in FIGS. 6 through 9 is another aspect in which the door seal separator and powered door opener are integrally connected.

Figure 6:
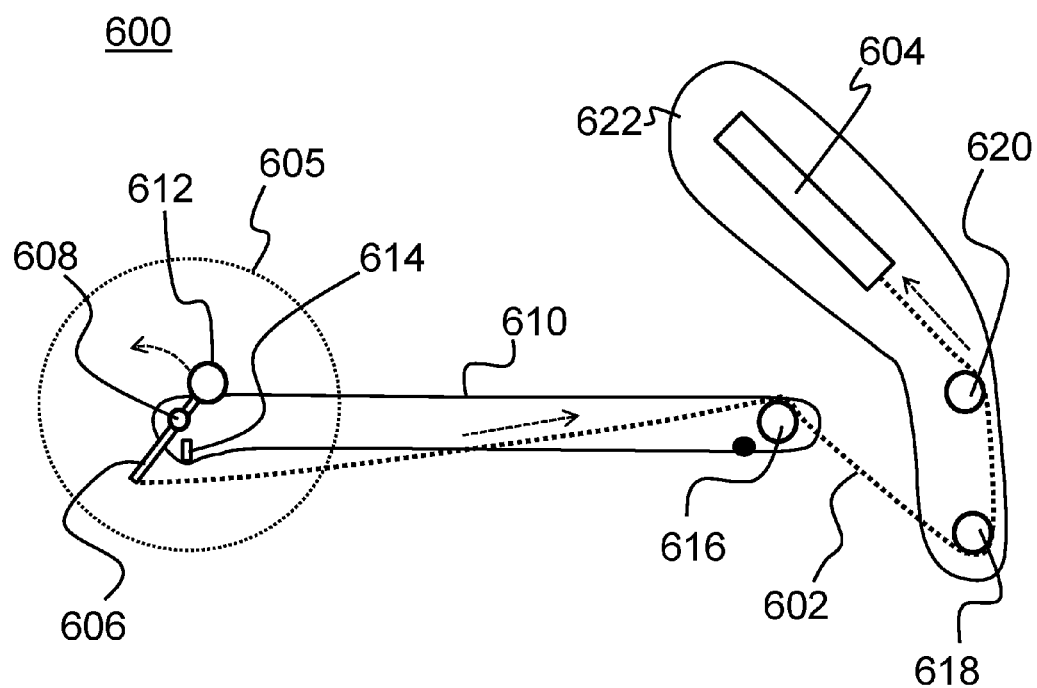
FIG. 6 is a top-view illustration of an automated refrigerator opener according to the present invention.

For clarity, FIG. 6 depicts the automated refrigerator opener 600 as detached from a refrigerator to more clearly illustrate its various components. As shown in FIG. 6, the automated refrigerator opener 600 includes a linkage 602 that interconnects and operates the various components. The linkage 602 is any suitably flexible yet durable material, a non-limiting example of which includes a cable. At one end of the automated refrigerator opener 600 is a powered door opener 604. The powered door opener 604 is any suitable mechanism or device that is operable for withdrawing or pulling the linkage 602. As a non-limiting example, the powered door opener 604 is a linear motor that is operably connected with the linkage 602.

At the other end of the automated refrigerator opener 600 is a door seal separator 605. The door seal separator 605 includes a rod 606 that is pivotally connected 608 with a door seal separator frame 610 (or directly to the top of the refrigerator door). At the other end of the rod 606 is a roller 612 that is used to separate a refrigerator door from the door casing. Additionally, a stop 614 is included to stop rotation of the rod 606 once the door seal is broken and cause the refrigerator door to open.

Finally, between the door seal separator 605 and the powered door opener 604 are a series of pulleys, such as a first pulley 616, a second pulley 618, and a third pulley 620. As can be understood by one skilled in the art, although three pulleys are depicted in this aspect, the invention is not intended to be limited thereto as any suitable number of pulleys or linkage accommodating devices (i.e., any suitable device that can re-direct the direction of a linkage) can be used. It should also be noted that the powered door opener 604 can be mounted directly to the refrigerator; however, the powered door opener 604 is desirably mounted to a powered door opener frame 622 for easy attachment to an existing refrigerator.

In operation, the powered door opener 604 withdraws the linkage 602 which causes the roller 612 to pivot out and break the door seal between the refrigerator door and door casing. Once the rod 606 hits the stop 614, it causes the door seal separator frame 610 to be drawn towards the second pulley 618, thereby opening the refrigerator door.

Figure 7:
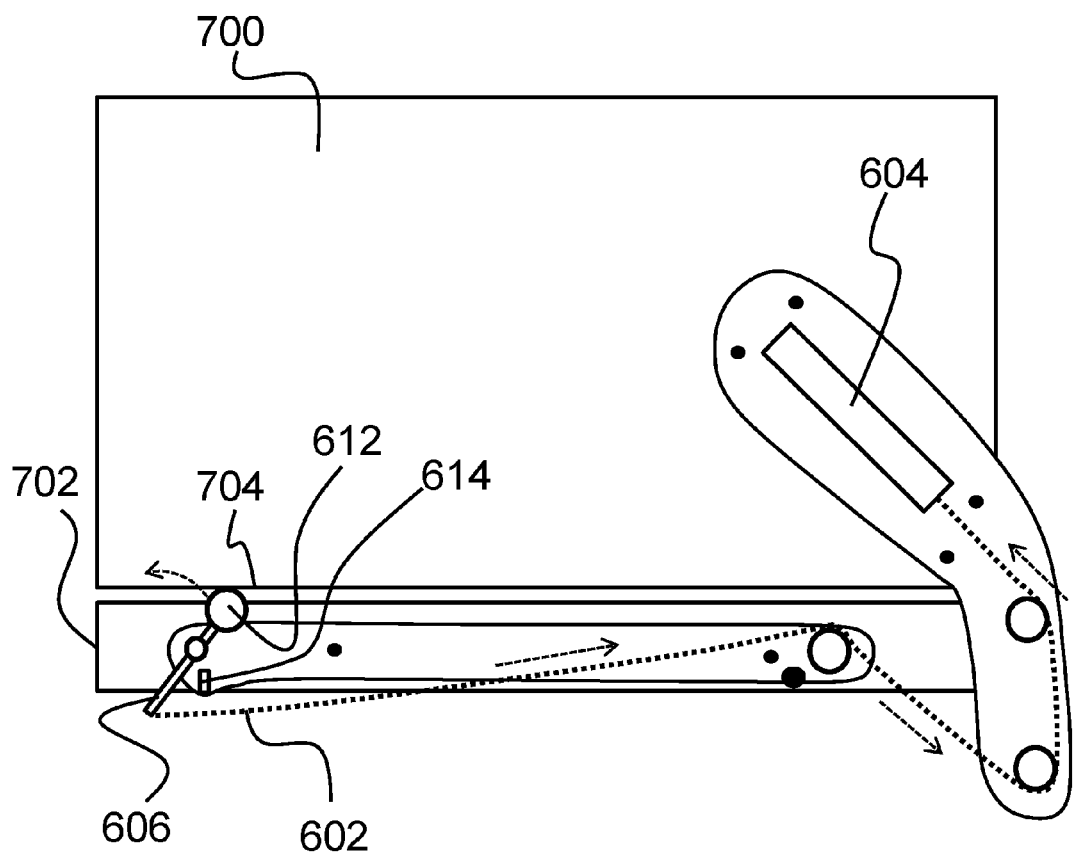
FIG. 7 is an top-view illustration of the automated refrigerator opener as depicted in FIG. 6, showing the refrigerator opener as attached with a refrigerator.
Figure 8:
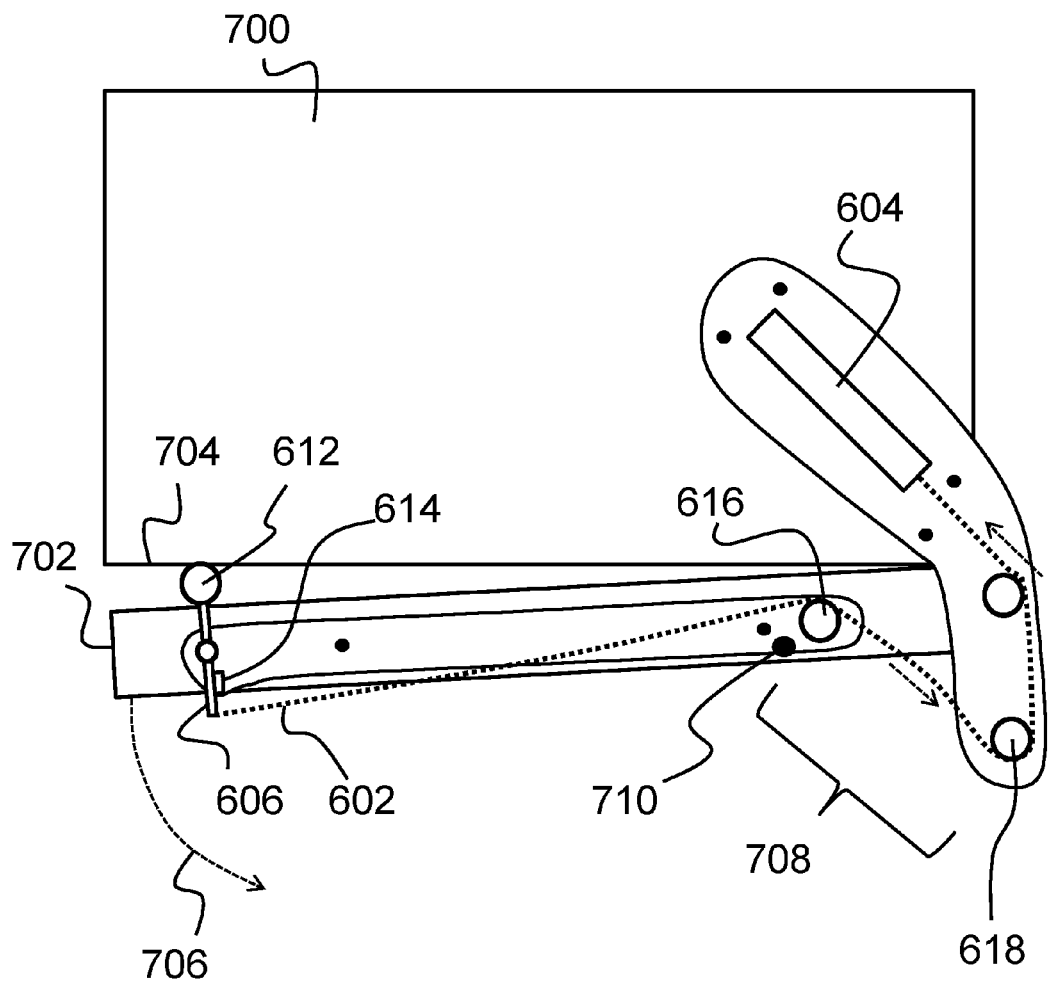
FIG. 8 is a top-view illustration of the automated refrigerator opener as depicted in FIG. 6, showing the refrigerator opener breaking a door seal between a refrigerator door and the refrigerator door casing.
Figure 9:
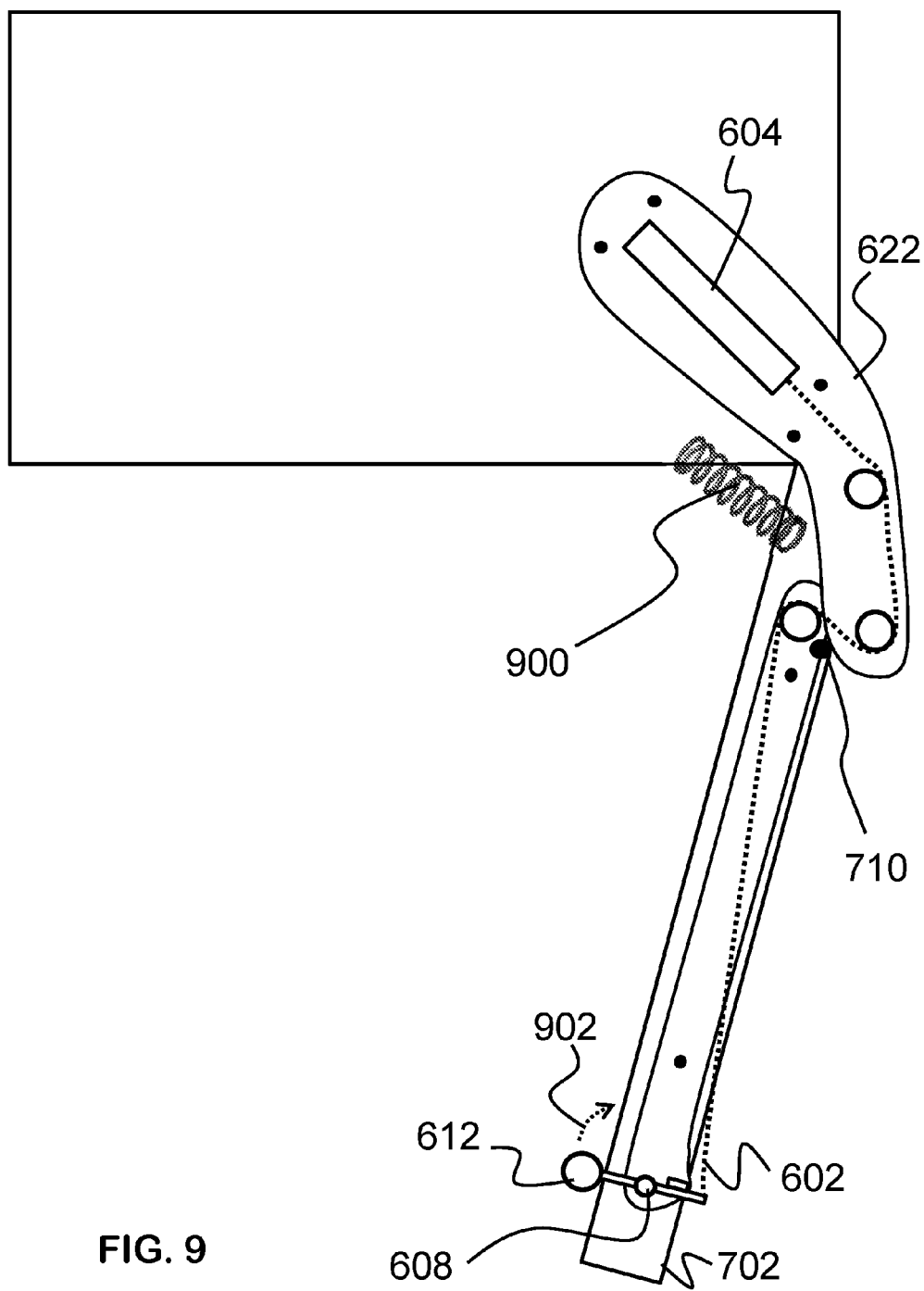
FIG. 9 is a top-view illustration of the automated refrigerator opener as depicted in FIG. 6, showing the refrigerator opener as having opened the refrigerator door.

This is further illustrated in FIGS. 7 through 9, which depicted the automated refrigerator opener as being attached with a refrigerator 700 and refrigerator door 702. As shown in FIGS. 7 and 8, as the powered door opener 604 withdraws (pulls in) the linkage 602, it causes the roller 612 to pivot out and push against the refrigerator door casing 704 to force the refrigerator door 702 away from the casing and break the door seal. The pivoting motion of the roller 612 continues until the rod 606 hits the stop 614. Because the door opener 604 is still withdrawing the linkage 602 and because the rod 606 is effectively pulled tight against the stop 614, the refrigerator door 702 begins to pivot open as the distance 708 between the first pulley 616 and second pulley 618 decreases.

The refrigerator door 702 is opened until either the powered door opener 604 ceases pulling in the linkage 602 (via a predetermined command) or a stop point is reached. For example, a door stop 710 can be positioned upon the door seal separator frame 610 for contacting with the powered door opener frame 622 and thereby stopping motion relative to the two.

This is further illustrated in FIG. 9, in which the refrigerator door 702 is fully open, with the door stop 710 engaging the powered door opener frame 622. As can be understood by one skilled in the art, there are numerous techniques for stopping the door at the desired point and the use of the door stop 710 is but one non-limiting example.

Once the powered door opener 604 ceases pulling on the linkage 602, the refrigerator door 702 can be closed. The refrigerator door can be closed manually by a user or automatically. As can be appreciated by one skilled in the art, any suitable technique can be used to automatically close the door. As a non-limiting example, the pivotal connection between the refrigerator 700 and refrigerator door 702 can be spring-loaded via any suitable spring-type mechanism. For example, a spring 900 can be mounted between the refrigerator 700 and refrigerator door 702 that would pull the door 702 closed once the powered door opener 604 releases the linkage 602. Additionally, the pivotal connection 608 of the rod 606 can be spring-loaded to cause the roller 612 to retract once the powered door opener 604 releases the linkage 602. Thus, once the powered door opener 604 ceases pulling on the linkage 602, the refrigerator door 702 will automatically close.

As can be understood by one skilled in the art, the control device, switching devices, power systems (e.g., batteries, cords, etc.), other sensors, electrical components, etc., that are described with respect to the aspect depicted in FIGS. 1 through 5 can be equally employed and integrated with the aspect depicted in FIGS. 6 through 9. For example, the control device is communicatively connected with the powered door opener and operable for receiving an actuation command from a user and, thereafter, causing the powered door opener to open the refrigerator door. Finally, it should be understood that although the components of the automated refrigerator opener are depicted as add on components to a refrigerator, the present invention is not intended to be limited thereto as they can be integrally attached with or formed with a refrigerator.

What is claimed is:

1. An automated refrigerator opener, comprising:
    a powered door opener operable for attaching with a refrigerator door and automatically opening the refrigerator door a door seal separator operable for breaking a door seal between a refrigerator door and a refrigerator door casing; and
    a control device communicatively connected with both the door seal separator and the powered door opener, the control device operable for receiving an actuation command from a user and, thereafter, activate the door seal separator to break the door seal and cause the powered door opener to open the refrigerator door.

2. The automated refrigerator opener as set forth in claim 1, wherein the control device is operable for receiving the actuation command and determine if an open command or a closed command was received and, if so, perform an appropriate open or close operation by causing the powered door opener to open or close the door.

3. The automated refrigerator opener as set forth in claim 2, wherein the door seal separator is a solenoid 4. The automated refrigerator opener as set forth in claim 3, wherein the powered door opener is a linear actuator.

5. The automated refrigerator opener as set forth in claim 4, wherein the linear actuator includes a base attachment end and an extension end, with the base attachment end being pivotally attachable with a refrigerator.

6. The automated refrigerator opener as set forth in claim 5, further comprising an elastic device attached with the extension end of the linear actuator and for attaching with the refrigerator door.

7. The automated refrigerator opener as set forth in claim 6, wherein the elastic device is a coil spring.

8. The automated refrigerator opener as set forth in claim 7, further comprising an adapter electronically connected with the control device for providing power to the automated refrigerator opener, the adapter having a male end configured to screw into a refrigerator light socket and a female end configured to receive a light bulb, whereby upon screwing into a refrigerator light socket, electricity can be provided to the automated refrigerator opener.

9. The automated refrigerator opener as set forth in claim 8, wherein the control device includes a timer such that upon opening the door, after a predetermined amount of time has passed and no close command has been received, the control device is configured to initiate a close command and cause the powered door opener to close the door.

10. The automated refrigerator opener as set forth in claim 9, wherein at least one of the control device and powered door opener include a safety mechanism to disable operation of the powered door opener upon activation of the safety mechanism.

11. The automated refrigerator opener as set forth in claim 10, wherein the safety mechanism is a mechanism selected from a group consisting of an amp meter and a slip clutch.

12. The automated refrigerator opener as set forth in claim 11, further comprising a microphone communicatively connected with the control device, and wherein the control device is configured to receive voice commands to activate the automated refrigerator opener, such that upon receiving audio signals from the microphone, the control device is operable for interpreting the audio signals to determine if an open command or a closed command was received.

13. The automated refrigerator opener as set forth in claim 11, further comprising a switching device communicatively connected with the control device, the switching device being a device selected from a group consisting of a hand controller and foot controller.

14. The automated refrigerator opener as set forth in claim 1, wherein the powered door opener is a linear actuator.

15. The automated refrigerator opener as set forth in claim 14, wherein the linear actuator includes a base attachment end and an extension end, with the base attachment end being pivotally attachable with a refrigerator.

16. The automated refrigerator opener as set forth in claim 15, further comprising an elastic device attached with the extension end of the linear actuator and for attaching with the refrigerator door.

17. The automated refrigerator opener as set forth in claim 16, wherein the elastic device is a coil spring.

18. The automated refrigerator opener as set forth in claim 1, wherein at least one of the control device and powered door opener include a safety mechanism to disable operation of the powered door opener upon activation of the safety mechanism.

19. The automated refrigerator opener as set forth in claim 18, wherein the safety mechanism is a mechanism selected from a group consisting of an amp meter and a slip clutch.

20. The automated refrigerator opener as set forth in claim 1, further comprising a microphone communicatively connected with the control device, and wherein the control device is configured to receive voice commands to activate the automated refrigerator opener, such that upon receiving audio signals from the microphone, the control device is operable for interpreting the audio signals to determine if an open command or a closed command was received.

21. The automated refrigerator opener as set forth in claim 1, further comprising an adapter electronically connected with the control device for providing power to the automated refrigerator opener, the adapter having a male end configured to screw into a refrigerator light socket and a female end configured to receive a light bulb, whereby upon screwing into a refrigerator light socket, electricity can be provided to the automated refrigerator opener.

22. The automated refrigerator opener as set forth in claim 1, wherein the control device includes a timer such that upon opening the door, after a predetermined amount of time has passed and no close command has been received, the control device is configured to initiate a close command and cause the powered door opener to close the door.

23. The automated refrigerator opener as set forth in claim 1, further comprising a switching device communicatively connected with the control device, the switching device being a device selected from a group consisting of a hand controller and foot controller.

24. The automated refrigerator opener as set forth in claim 1, wherein the door seal separator is a solenoid.

25. An automated refrigerator opener, comprising: a powered door opener operable for attaching with a refrigerator door and automatically opening the refrigerator door; and a control device communicatively connected with the powered door opener, the control device operable for receiving an actuation command from a user and, thereafter, cause the powered door opener to open the refrigerator door; and a door seal separator connected with the powered door opener via a linkage, the door seal separator operable for breaking a door seal between a refrigerator door and a refrigerator door casing.

26. The automated refrigerator opener as set forth in claim 25, further comprising a door seal separator frame, wherein the door seal separator includes a rod pivotally connected with the door seal separator frame, the rod being connected with the linkage and including a roller that is operable for breaking the door seal.

* * * * *